United States Patent
Macherla et al.

(10) Patent No.: US 9,990,345 B1
(45) Date of Patent: *Jun. 5, 2018

(54) CONVERTING RNG FILES TO EXTENSIBLE AND NONEXTENSIBLE XML SCHEMAS

(71) Applicant: SAP SE, Walldorf (DE)

(72) Inventors: Kaushik Macherla, Fremont, CA (US); Genneva Wang, Palo Alto, CA (US); John Mitchell, Dublin, CA (US)

(73) Assignee: SAP SE, Walldorf (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/392,905

(22) Filed: Dec. 28, 2016

(51) Int. Cl.
*G06F 17/22* (2006.01)
*G06F 17/30* (2006.01)
*G06Q 30/04* (2012.01)
*G06Q 30/06* (2012.01)

(52) U.S. Cl.
CPC ........ *G06F 17/227* (2013.01); *G06F 17/2205* (2013.01); *G06F 17/30091* (2013.01); *G06Q 30/04* (2013.01); *G06Q 30/0633* (2013.01)

(58) Field of Classification Search
CPC ..... G06F 17/21; G06F 17/2247; G06F 17/227
See application file for complete search history.

(56) References Cited

U.S. PATENT DOCUMENTS

| 6,968,503 B1 * | 11/2005 | Chang ................. G06F 17/2247 707/999.006 |
| 7,454,488 B2 * | 11/2008 | Wechter ............. H04L 41/0213 709/223 |
| 2004/0153967 A1 * | 8/2004 | Bender ............... G06F 17/2247 715/234 |
| 2016/0218921 A1 * | 7/2016 | Christensen ........ H04L 63/0823 |

* cited by examiner

*Primary Examiner* — Cesar Paula
*Assistant Examiner* — Benjamin Norris
(74) *Attorney, Agent, or Firm* — Jones Day

(57) ABSTRACT

A regular language for XML, next generation (RNG) file referencing an RNG schema file is obtained. Subsequently, the referenced RNG schema file is stored in a file directory structure matching a reference definition of the schema in the RNG file. Based on the RNG file, a first nonextensible schema and a first extensible schema are generated each corresponding to the referenced RNG schema file. Related apparatus, systems, techniques and articles are also described.

20 Claims, 4 Drawing Sheets

US 9,990,345 B1

CONVERTING RNG FILES TO EXTENSIBLE AND NONEXTENSIBLE XML SCHEMAS

CROSS-REFERENCE TO RELATED APPLICATIONS

This application is related to the following applications, filed on even date herewith, the entire contents of each of which are incorporated by reference herein:

U.S. patent application Ser. No. 15/392,588, entitled "Converting Nonextensible Schemas of XML Documents to RNG Files;" and U.S. patent application Ser. No. 15/392,610, entitled "Generating an Extensible Schema and Nonextensible by Creating an RNC and an RNG File From a Received Nonextensible Schema."

TECHNICAL FIELD

The subject matter described herein relates to eXtensible Markup Language (XML) documents, such as cXML (commerce XML) documents.

BACKGROUND

Some entities exchange documents, such as purchase orders, order confirmations, invoices, catalogs, or advanced ship notices, that are written in commerce eXtensible Markup Language (cXML). Additionally, some Internet transactions are supported by cXML, such as real-time invoice-status updates or PunchOut. A commerce hub can establish different cXML schemas, which can be provided as nonextensible Document Type Definitions (DTDs) that can provide templates for particular types of documents or transactions. As one exemplary process flow, a sender can send a cXML document to the commerce hub, which can authenticate the sender, perform format and content validation on the document, manage security, store the document, and/or route the document to an appropriate recipient. However, the nonextensible schema (e.g., DTD) established by the commerce hub may not necessarily include all of the information that an entity wishes to include in a given document or transaction, e.g., based on a recipient request for such information. Senders can include custom information as extrinsics. The sender need not necessarily update the nonextensible schema, but instead can directly make changes to the cXML document by adding their custom extrinsics. The current non-extensible schema (e.g., DTD) already supports using extrinsics. An exemplary extrinsic is a name/value pair that can be used directly in the cXML. In addition, various senders might create their own custom extrinsics which the receiver needs to understand for mapping. In addition, many senders can end up creating their own custom extrinsic for the same functional use, which can lead to redundancy. Also, the commerce hub may not necessarily understand the value/meaning of the custom field/extrinsic. In addition, it is not necessarily easily manageable/documentable.

SUMMARY

Under one aspect, a computer-implemented method includes obtaining a regular language for XML next generation (RNG) file referencing an RNG schema file. The method also includes storing the referenced RNG schema file in a file directory structure matching a reference definition of the schema in the RNG file. The method also includes generating, based on the RNG file, a first nonextensible schema and a first extensible schema each corresponding to the referenced RNG schema file.

Optionally, the first nonextensible schema and first extensible schema are referenced in a commerce XML (cXML) document. The first nonextensible schema optionally can include a document type definition (DTD). Optionally, the first extensible schema includes an XML schema definition (XSD). Optionally, the cXML document includes a purchase order, order confirmation, invoice, catalog, or advanced ship notice.

Optionally, obtaining the RNG file includes obtaining a second nonextensible schema including a first content model of ANY. Obtaining the RNG file also can include generating, based on the second nonextensible schema, a compact syntax regular language for XML next generation (RNC) file including a second content model of ANY. The second content model of ANY can correspond to the first content model of ANY. Obtaining the RNG file also can include modifying, based upon the RNC file including the second content model of ANY, the RNC file so as to explicitly enumerate all semantics of the second content model of ANY as elements in the RNC file. Obtaining the RNG file also can include generating, based on the modified RNC file, the RNG file. The method optionally also can include, based upon the referenced RNG schema file including a wildcard or a content model of ANY, modifying the referenced RNG schema file so as to remove the wildcard or the content model of ANY. The method optionally also can include storing the modified first extensible schema in a file directory structure matching a reference definition of the referenced RNG schema file in the RNG file.

Optionally, the method is implemented at a commerce hub coupled to a vendor node and a plurality of customer nodes. Optionally, the commerce hub receives the cXML document from a customer node of the plurality of customer nodes and transmits the cXML document to the vendor node. Optionally, the commerce hub receives the cXML document from the vendor node and transmits the cXML document to a customer node of the plurality of customer nodes.

Under another aspect, a system includes a central processing unit; and a computer-readable medium storing instructions for causing the central processing unit to perform operations. The operations can include obtaining a regular language for XML next generation (RNG) file referencing an RNG schema file. The operations also can include storing the referenced RNG schema file in a file directory structure matching a reference definition of the schema in the RNG file. The operations also can include generating, based on the RNG file, a first extensible markup language (XML) document referencing a first nonextensible schema and a first extensible schema each corresponding to the referenced RNG schema file.

Optionally, the first nonextensible schema and first extensible schema are referenced in a commerce XML (cXML) document. Optionally, the first nonextensible schema includes a document type definition (DTD). Optionally, the first extensible schema includes an XML schema definition (XSD). Optionally, the cXML document includes a purchase order, order confirmation, invoice, catalog, or advanced ship notice.

Optionally, the computer-readable medium stores instructions for causing the central processing unit to obtain the RNG file using operations including obtaining a second nonextensible schema including a first content model of ANY. The operations also can include generating, based on the second nonextensible schema, a compact syntax regular language for XML next generation (RNC) file including a second content model of ANY. The second content model of ANY can correspond to the first content model of ANY. The operations also can include modifying, based upon the RNC file including the second content model of ANY, the RNC file so as to explicitly enumerate all semantics of the second content model of ANY as elements in the RNC file. The operations also can include generating, based on the modified RNC file, the RNG file. The computer-readable medium optionally further stores instructions for causing the central processing unit to perform operations including based upon the referenced RNG schema file including a wildcard or a content model of ANY, modifying the referenced RNG schema file so as to remove the wildcard or the content model of ANY; and storing the modified first extensible schema in a file directory structure matching a reference definition of the referenced RNG schema file in the RNG file.

Optionally, the central processing unit is located at a commerce hub coupled to a vendor node and a plurality of customer nodes. Optionally, the central processing unit receives the cXML document from a customer node of the plurality of customer nodes and transmits the cXML document file to the vendor node, or the central processing unit receives the cXML document from the vendor node and transmits the cXML document to a customer node of the plurality of customer nodes.

Under another aspect, an article of manufacture includes computer executable instructions stored on non-transitory computer readable media, which, when executed by at least one computer, causes the at least one computer to perform operations. The operations can include obtaining a regular language for XML next generation (RNG) file referencing an RNG schema file. The operations also can include storing the referenced RNG schema file in a file directory structure matching a reference definition of the schema in the RNG file. The operations also can include generating, based on the RNG file, a nonextensible schema and an extensible schema each corresponding to the referenced RNG schema file.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, process flows can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the present subject matter can provide a faster, non-disruptive process for releasing newer versions of schema, can provide the use of schema extensions so as to append desired information fields to a schema that otherwise excludes such fields, can provide a central repository of schema files for developers, customer integration teams and customers, and can facilitate lifecycle, review and approval for schemas. Additionally, the present subject matter can support documents having multiple formats so as to facilitate processing of the documents by different types of entities.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
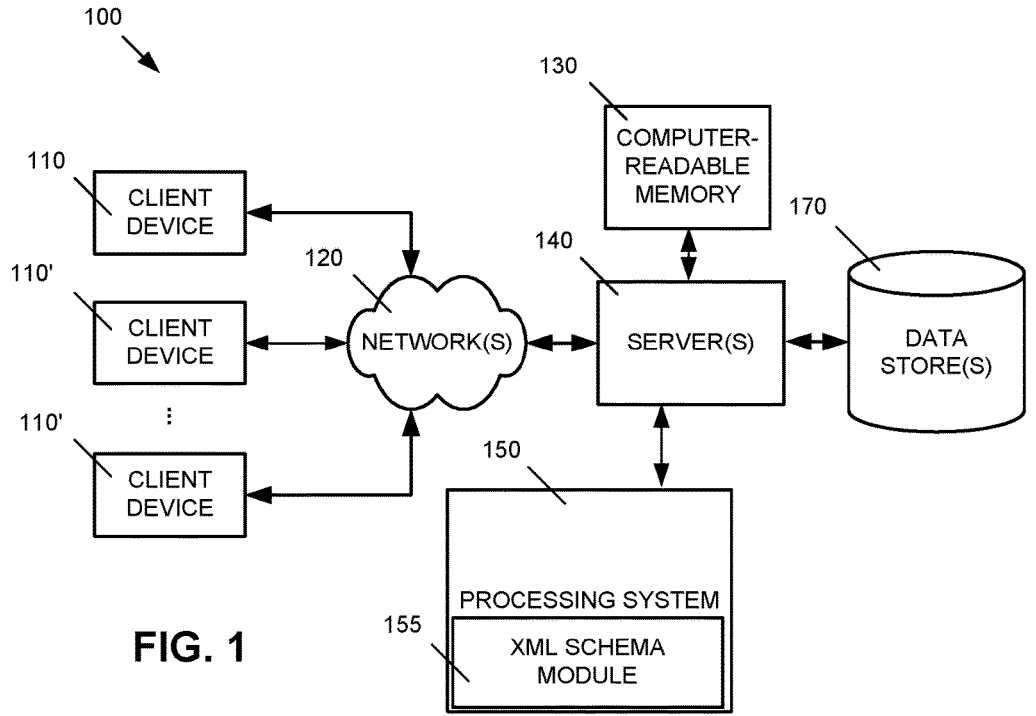
FIG. 1 schematically illustrates components of an exemplary system for generating and distributing extensible schemas and new nonextensible schemas based on nonextensible schemas of XML (eXtensible Markup Language) documents.

The systems, computer-readable media, and methods provided herein can provide enhanced schemas for XML (eXtensible Markup Language) documents, including but not limited to cXML (commerce XML) documents. For example, a nonextensible schema, such as a DTD (document type definition) of an XML document can include custom fields that can carry desired information for the sender and/or recipient but that are not readily processed by other parties, such as by a commerce hub acting as an intermediary between the sender (e.g., vendor or customer) and recipient (e.g., customer or vendor). Under some aspects, the nonextensible schema can be used to generate and distribute an extensible schema and a new nonextensible schema that can carry enhanced information facilitating communication of information between the sender, commerce hub, and recipient. For example, the nonextensible schema can be used to generate an RNG (regular language for XML next generation) file. The RNG file can be used to generate a new nonextensible schema, e.g., a new DTD, and an extensible schema, e.g., an XSD (XML schema definition) or JAXB (Java architecture for XML binding), each of which can carry enhanced information as compared to the initial nonextensible schema. An XML document can be generated that references both of the new nonextensible schema and the extensible schema. The new nonextensible schema and/or the extensible schema respectively can reference plugins to the initial nonextensible schema, e.g., so as to provide an extension for the information that was provided in the initial nonextensible schema. It should be appreciated that such operations or processes can be, but need not necessarily, be used in conjunction with one another.

Illustratively, the present systems, computer-readable media, and methods can support extensible and other schema formats for XML schema definitions, e.g., cXML schema definitions, and/or can add an extension mechanism for XML schemas, e.g., cXML schemas. For example, the present systems, computer-readable media, and methods can support both DTD and XSD schema formats. This can be useful because some entities (e.g., vendors or customers) may wish to use XSD schemas, while other entitles (e.g., vendors or customers) may wish to use DTD schemas. As provided herein, RNG can be used as an intermediate XML schema format that can be converted to both XSD and DTD. As such, using an RNG schema format can facilitate support of both XSD and DTD formats. However, it can be desirable that the RNG schema format is equivalent to an initial XML (e.g., cXML) DTD format. Illustratively, a suitable conversion tool can be used to generate an RNC file based on a cXML DTD. The RNC file can be modified so that all of the semantics of a single ANY explicitly enumerates the elements in the RNC file. A conversion tool can be used to generate an RNG schema file based on this RNC file. The XSD and DTD formats then can be generated based on this RNG schema file using the same or a different conversion tool.

For example, based upon the RNG file lacking any dependent schemas, the XSD and DTD formats can be generated directly based on this RNG schema file, without further modifications to the RNG schema file. Or, for example, example, an RNG file can include one or more dependent schemas, such as extensions or references, and there can be many levels of extension/reference RNG schema files. Among this base (core) RNG file and its hierarchy of extension/reference schema files, it can be desirable to maintain element uniqueness so as to facilitate generating XSD and DTD files based on the RNG file, for example by implementing the following process:

(a) Loop through the base RNG file and identify all the referenced schema files (including extensions).

(b) Based upon the referenced schemas not already being converted to XSD/DTD, such XSD/DTD files are generated based on the referenced schemas using a suitable conversion tool.

(c) Retrieve the content of all the referenced files. Update each referenced schema by removing the "ANY" section from the schema to avoid potential conflict in the element names with the ones in the base RNG. ANY is a definition in an RNG that captures all the element definitions in a particular RNG.

(d) All the referenced files can be saved to a file system retaining the file directory structure. This structure can match the reference definition in the base RNG. The file system is used during generation of the XSD/DTD based on the RNG.

(e) The XSD/DTD then is generated based on the RNG.

Additionally, or alternatively, an extension mechanism can provide a way for schema developers to create extension and use them in the core (base) schema. A schema wildcard (xs:any) placeholder can be placed at locations in the core schema where the extension schema are to be plugged in. The schema wild card can be a complete wildcard, or can be restricted to a particular extension. The extension mechanism also can include supporting extensions for nonextensible schema, such as DTDs. DTDs do not have a wildcard element such as (xs:any), and so all the elements of the referenced extension can be added to the ANY tag of the core DTD. An exemplary process for providing an extension mechanism can include:

(a) Developers create or update core/extension schemas in RNG.

(b) Update core schemas with extension placeholders.

(c) Convert schemas to XSD and DTD formats using the service.

(d) Usage of schemas in XML: include core XSD reference to the header of the XML and wrap the extension portion of the XML with the extension schema reference.

(e) To support backward compatibility, also include a reference to the core DTD in the XML header.

(f) Users of the XML can validate the XML against either XSD or DTD and also validate (if needed) the extension portions of the XSD.

Still other examples can include any suitable combination of the following operations:

Conversion of the current non extensible schemas to RNG format (via RNC) can be a one-time process;

Conversion of RNG schema to extensible (e.g., XSD) and nonextensible (e.g., DTD) schema formats can be performed during the schema development process. This can be an on-going process, and need not necessarily be performed during run time. This also includes schema extension development;

The extensible and nonextensible schemas then can be published for external customers/clients to use (optionally, periodically new versions can be published and/or the schema development process can be opened up to external customers);

The customers/clients can add a reference to these files (located on the server) and/or can download the schema files locally;

When customers/clients send their cXML(XML) files referencing the schema or nonschema, it is validated by the server (e.g., commerce hub) and after processing, forwarded by the commerce hub to the receiver. The receiver validates and also uses the referenced schema to parse the data and further process it.

Further details, examples, and options of the present systems, computer-readable media, and methods now will be provided with reference to FIGS. 1-6.

FIG. 1 schematically illustrates components of an exemplary system 100 for generating and distributing extensible schemas and new nonextensible schemas based on nonextensible schemas of XML documents. In system 100, one or more client devices 110, 110' access one or more servers 140 running one or more XML schema modules 155 on a processing system 150 via one or more networks 120. Alternatively, one or more of client device 110 and server 140 can be the same computing device, eliminating the need for network 120. One or more servers 140 can access computer-readable memory 130 as well as one or more data stores 170. In addition, a client device 110, 110' can download the schema file locally and reference it, e.g., in an XML document that the client generates.

In one exemplary configuration, one or more of client devices 110 corresponds to a vendor node, one or more of client devices 110' correspond to a customer node, and server(s) 140 correspond to a commerce hub coupled to vendor node 110 and to customer node(s) 110'. The vendor node 110 can send XML documents, such as cXML documents, to customer node(s) 110' via commerce hub 140. Additionally, or alternatively, customer node(s) 110' can send XML documents, such as cXML documents, to vendor node 110 via commerce hub 140. Non-limiting examples of cXML documents that can be sent by vendor node 110 or by customer node(s) 110' include purchase orders, order confirmations, invoices, catalogs, and advanced ship notices. Vendor node 110 and customer node(s) 110' each can include, for example, a respective central processing unit and a computer-readable medium storing instructions for causing the respective central processing unit to perform one or more operations such as provided herein, e.g., configured to transmit or receive an XML document that references an extensible schema and/or a nonextensible schema.

Commerce hub 140 can be configured so as to convert nonextensible schemas, such as DTDs, which can have limited functionality, into both extensible schemas and new nonextensible schemas that are enhanced relative to the initial nonextensible schema. Illustratively, the extensible and new nonextensible schemas can provide extensions that facilitate schema customization by the vendor and/or customer, e.g., providing customized fields, without the need for modifying the core schema. For example, commerce hub 140 can provide nonextensible schema to processing system 150 for processing by XML schema module 155. Illustratively, processing system 150 can include a central processing unit and a computer-readable medium storing instructions (e.g., XML schema module 155) for causing the central processing unit to perform one or more operations such as provided herein, e.g., configured to perform one or more operations for converting a first nonextensible schema into an extensible schema and a second nonextensible schema that optionally include extensions, e.g., reference plugins corresponding to the first nonextensible schema. Commerce hub 140 can communicate with data store(s) 170, e.g., so as to store or retrieve XML documents and/or schema or parameters for use in generating or modifying schema, and can communicate with computer-readable memory 130, e.g., so as to direct XML documents and/or schema from the appropriate vendor node 110 to the appropriate customer node(s) 110'.

Additionally, or alternatively, commerce hub 140 can be configured so as to analyze whether an XML document being sent from a client device 110, 110' to another client device 110, 110' references both an extensible schema and a nonextensible schema. If not, then commerce hub 140 can be configured so as to send a message to the sender requesting that the sender update the XML document so as to reference the extensible schema and the nonextensible schema, e.g., so as to reference such schema by including respective links (URL) to the extensible schema and the nonextensible schema. The commerce hub 140 can be configured so as to generate such extensible and nonextensible schemas whenever the source file changes, e.g., an RNG file such as described herein, during a schema development process. The schema files then can be tested and released for external usage. After that, clients 110, 110' can refer to the schema files. The schema files themselves can be stored at commerce hub 140, and can be downloaded and used locally by clients 110, 110'.

Figure 2:
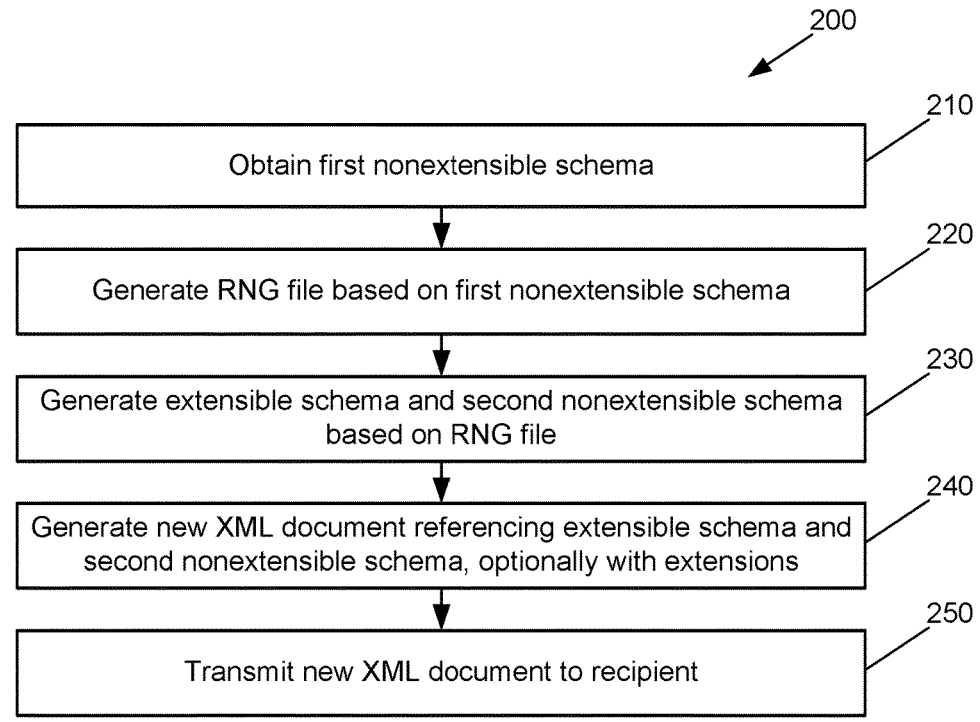
FIG. 2 is a process flow diagram illustrating generation and distribution of extensible schemas and new nonextensible schemas based on nonextensible schemas of XML documents.

FIG. 2 is a process flow diagram 200 illustrating generation and distribution of extensible schemas and new nonextensible schemas based on nonextensible schemas of XML documents. Although process flow diagram 200 illustrated in FIG. 2 optionally can be implemented by system 100 illustrated in FIG. 1, it should be appreciated that process flow diagram 200 can be implemented using any suitable combination of hardware and software components distributed among any suitable number and type of devices.

Process flow diagram 200 illustrated in FIG. 2 can include obtaining a first nonextensible schema, such as a DTD (210).

Process flow diagram 200 illustrated in FIG. 2 also can include generating an RNG file based on the first nonextensible schema (220). For example, commerce hub 140 illustrated in FIG. 1 can provide the XML document and/or first nonextensible schema to processing system 150 for processing by XML schema module 155. XML schema module 155 can include instructions for causing the central processing unit of processing system 150 to generate an RNG file based on the first nonextensible schema. In one exemplary configuration, XML schema module 155 includes instructions for causing the central processing unit of processing system 150 to generate an RNG file based on the first nonextensible schema by computationally implementing the operations of process flow diagram 300 described further below with reference to FIG. 3.

Process flow diagram 200 illustrated in FIG. 2 also can include generating an extensible schema and a second nonextensible schema based on the RNG file (230). For example, XML schema module 155 illustrated in FIG. 1 can include instructions for causing the central processing unit of processing system 150 to generate the extensible schema and the second nonextensible schema based on the RNG file. In one exemplary configuration, XML schema module 155 can include instructions for causing the central processing unit of processing system 150 to generate the extensible schema and the second nonextensible schema based on the RNG file by computationally implementing the operations of process flow diagram 400 described further below with reference to FIG. 4. Illustratively, the extensible schema can include an XSD, and the second nonextensible schema can include a modified DTD.

Referring again to FIG. 2, process flow diagram 200 also can include generating an XML document referencing the extensible schema and second nonextensible schema, optionally with extensions (240). For example, responsive to an indication from commerce hub 140 that a previous XML document cannot be transmitted because it lacks reference(s) to both the extensible and second nonextensible schema, client 110 or 110' can generate a new XML document referencing the extensible schema and second nonextensible schema, optionally with extensions. The cXML document optionally can include one or more of a purchase order, order confirmation, invoice, catalog, and advanced ship notice. In one exemplary configuration, XML schema module 155 illustrated in FIG. 1 can include instructions for causing the central processing unit of processing system 150 to generate extensible schema and second nonextensible schema with extensions by computationally implementing the operations of process flow diagram 500 described further below with reference to FIG. 5.

Process flow diagram 200 illustrated in FIG. 2 further can include transmitting the new XML document to a recipient (250). For example, commerce hub 140 illustrated in FIG. 1 send the new XML document to the vendor node 110 based upon having received such XML document from a customer node 110', or commerce hub 140 can send the new XML document to the customer node 110' based upon having received such XML document from vendor node 110. Because the new XML document references both an extensible schema and a nonextensible schema, the recipient of the XML document readily can use the document, regardless of whether such recipient prefers the use of extensible schema or nonextensible schema.

Figure 3:
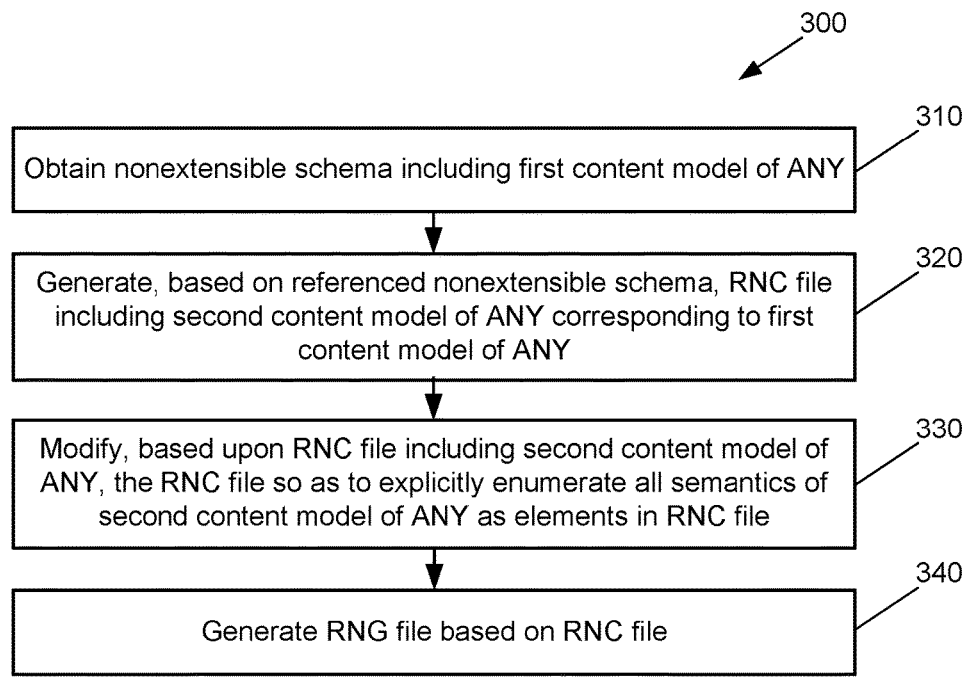
FIG. 3 is a process flow diagram illustrating conversion of a nonextensible schema of an XML document to an RNG (regular language for XML next generation) file.

FIG. 3 is a process flow diagram 300 illustrating conversion of a nonextensible schema of an XML document to an RNG (regular language for XML next generation) file. Process flow diagram 300 can be implemented at a commerce hub (e.g., commerce hub 140 illustrated in FIG. 1) coupled to a vendor node (e.g., vendor node 110 illustrated in FIG. 1) and a plurality of customer nodes (e.g., customer node(s) 110' illustrated in FIG. 1). Additionally, process flow diagram 300 can be computer-implemented, e.g., can be implemented by XML schema module 155 operating on processing system 150 illustrated in FIG. 1, or any other suitable combination of hardware and software. It should be appreciated that process flow diagram 300 can be implemented independently of process flow diagram 200 described herein with reference to FIG. 2, e.g., need not necessarily be implemented solely as part of a process flow for generating and distributing extensible schemas and new nonextensible schemas based on nonextensible schemas of XML documents. Additionally, process flow diagram 300 can be implemented independently of process flow diagram 400 described herein with reference to FIG. 4 and/or independently of process flow diagram 500 described herein with reference to FIG. 5.

Process flow diagram 300 illustrated in FIG. 3 can include obtaining a nonextensible schema, such as a DTD, including a first content model of ANY (310). Illustratively, the XML document can include a cXML document referencing a nonextensible schema, such as a DTD. In configurations in which operation 310 is implemented using system 100 illustrated in FIG. 1, the nonextensible schema (e.g., DTD) can be stored, for example, in computer-readable memory 130, data store(s) 170, in a buffer of processing system 150, or in any other suitable location within or connected to system 100, e.g., via network(s) 120.

Referring again to FIG. 3, process flow diagram 300 further can include generating, based on the nonextensible schema, a compact syntax regular language for XML next generation (RNC) file including a second content model of ANY, the second content model of ANY corresponding to the first content model of ANY (320). For example, XML schema module 155 of processing system 150 illustrated in FIG. 1 can be configured so as to cause the central processing unit of the processing system to generate, based on the nonextensible schema, an RNC file including a second content model of ANY, the second content model of ANY corresponding to the first content model of ANY. For example, a content model of ANY in a DTD can correspond to a specific syntax that symbolizes objects that are declared within the DTD. Illustratively, the DTD includes a declaration of entities and relationships, and a content model of ANY can refer to all entities and relationships (e.g., elements) declared within the DTD, e.g., can provide a wildcard reference to all such declared entities and relationships.

The RNC file can be generated based on the DTD using any suitable conversion tool, e.g., a conversion tool that is custom-designed or that is commercially available. A non-limiting example of a commercially available, open source tool for converting a DTD to an RNC file is TRANG, which is available for download from the Thai Open Source Software Center Ltd. at URL www.thaiopensource.com/relaxng/trang.html. For example, XML schema module 155 can be configured so as to cause the central processing unit of processing system 150 to execute TRANG on the DTD file so as to generate the RNC file. Any suitable combination of parameters or options can be input to TRANG at operation 320, which parameters or options can be stored within XML schema module 155 and/or stored within computer-readable memory 130, so as to cause TRANG to appropriately generate the RNC file based on the DTD file. Illustratively, options in TRANG to generate an RNC file based on the DTD file include one or both of the following: (1) inline-attlist option, which specifies not to generate definitions for attribute list declarations and instead to move attributes declared in attribute list declarations into the definitions generated for element declarations; and/or (2) strict-any option, which preserves the exact semantics of ANY content models by using an explicit choice of references to all declared elements option. In configurations in which operation 320 is implemented using system 100 illustrated in FIG. 1, the RNC file can be stored, for example, in computer-readable memory 130, data store(s) 170, in a buffer of processing system 150, or in any other suitable location within or connected to system 100, e.g., via network(s) 120.

Process flow diagram 300 illustrated in FIG. 3 further can include modifying, based upon the RNC file including the second content model of ANY, the RNC file so as to explicitly enumerate all of the semantics of the second content model of ANY as elements in the RNC file (330). For example, XML schema module 155 of processing system 150 illustrated in FIG. 1 can be configured so as to cause the central processing unit of the processing system to modify, based upon the RNC file including the second content model of ANY, the RNC file so as to explicitly enumerate all of the semantics of the second content model of ANY as elements in the RNC file. Alternatively, the RNC file can be manually modified, e.g., using one or more input devices coupled to commerce hub 140, so as to explicitly enumerate all of the semantics of the second content model of ANY as elements in the RNC file. Such modifications of the RNC file can facilitate generation of an RNG file based on the RNC file. For example, it is believed that TRANG presently cannot generate an RNG file based on an RNC file that includes a content model of ANY, so it can be helpful to modify the RNC file so that all of the semantics of a single ANY explicitly enumerate the elements in the RNC file. In configurations in which operation 330 is implemented using system 100 illustrated in FIG. 1, the modified RNC file can be stored, for example, in computer-readable memory 130, data store(s) 170, in a buffer of processing system 150, or in any other suitable location within or connected to system 100, e.g., via network(s) 120.

Process flow diagram 300 illustrated in FIG. 3 further can include generating, based on the modified RNC file, an RNG file (340). For example, XML schema module 155 of processing system 150 illustrated in FIG. 1 can be configured so as to cause the central processing unit of the processing system to generate, based on the modified RNC file, an RNG file. The RNG file can be generated based on the modified RNC file using any suitable conversion tool, e.g., a conversion tool that is custom-designed or that is commercially available. A non-limiting example of a commercially available, open source tool for converting a DTD to an RNC file is TRANG, mentioned above. For example, XML schema module 155 can be configured so as to cause the central processing unit of processing system 150 to execute TRANG on the modified so as to generate the RNC. Any suitable combination of parameters or options can be input to TRANG at operation 340, which parameters or options can be stored within XML schema module 155 and/or stored within computer-readable memory 130, so as to cause TRANG to appropriately generate the RNG file based on the modified RNC file. Illustratively, parameters in TRANG to generate an RNG file based on the modified RNC file include one or both of the following: (1) RNC file as input parameter, and (2) RNG file as output parameter.

An exemplary RNG file such as can be generated based on an RNC file is provided below (Example 1):

```
<?xml version="1.0" encoding="UTF-8"?>
<grammar xmlns:a="http://relaxng.org/ns/compatibility/annotations/1.0"
    xmlns:xsi="http://www.w3.org/2001/XMLSchema-instance"
    xmlns="http://relaxng.org/ns/structure/1.0">
  <define name="first">
    <element name="first">
      <text/>
    </element>
  </define>
  <define name="last">
    <element name="last">
      <text/>
    </element>
  </define>
  <define name="user">
    <element name="user">
      <ref name="first"/>
      <ref name="last"/>
    </element>
  </define>
  <start>
    <ref name="user"/>
  </start>
</grammar>
```

In this example, the above RNG file includes definitions for the first and last names of a user as text (string) elements. The RNG file generated by operation 340 can be syntactically the same as the original DTD. In configurations in which operation 340 is implemented using system 100 illustrated in FIG. 1, the RNG file can be stored, for example, in computer-readable memory 130, data store(s) 170, in a buffer of processing system 150, or in any other suitable location within or connected to system 100, e.g., via network(s) 120.

Optionally, the RNG file generated using process flow diagram 300 illustrated in FIG. 3 can be used to generate an XML document including an extensible schema and a nonextensible schema, e.g., a modified cXML document that references an XSD and a modified DTD each based on the RNG file. As another option, process flow diagram 300 can include the commerce hub 140 transmitting to the vendor node 110 and/or to a customer node 110' of the plurality of customer nodes the XML document, e.g., the cXML document, including an extensible schema and a nonextensible schema each based on the RNG file. For example, XML schema module 155 can include instructions for causing the central processing unit of processing system 155 to transmit to the vendor node 110 and/or to a customer node 110' the cXML document including an extensible schema and a nonextensible schema each based on the RNG file. The cXML document optionally can include one or more of a purchase order, order confirmation, invoice, catalog, and advanced ship notice.

It should be appreciated that process flow diagram 300 can be implemented using any suitable combination of hardware and software. In one nonlimiting configuration, an article of manufacture includes computer executable instructions stored on a non-transitory computer readable medium, which, when executed by a computer, causes the computer to perform operations including: obtaining a nonextensible schema including a first content model of ANY (e.g., implementing operation 310 of process flow diagram 300); generating, based on the nonextensible schema, a compact syntax regular language for XML next generation (RNC) file including a second content model of ANY, the second content model of ANY corresponding to the first content model of ANY (e.g., implementing operation 320 of process flow diagram 300); modifying, based upon the RNC file including the second content model of ANY, the RNC file so as to explicitly enumerate all of the semantics of the second content model of ANY as elements in the RNC file (e.g., implementing operation 330 of process flow diagram 300); and generating, based on the modified RNC file, a regular language for XML next generation (RNG) file (e.g., implementing operation 340 of process flow diagram 300). In an example, the nonextensible schema includes a document type definition (DTD). However, it should be appreciated that the present systems, methods, and articles of manufacture suitably can be applied to any suitable type of XML document and any suitable type of nonextensible schema.

Figure 4:
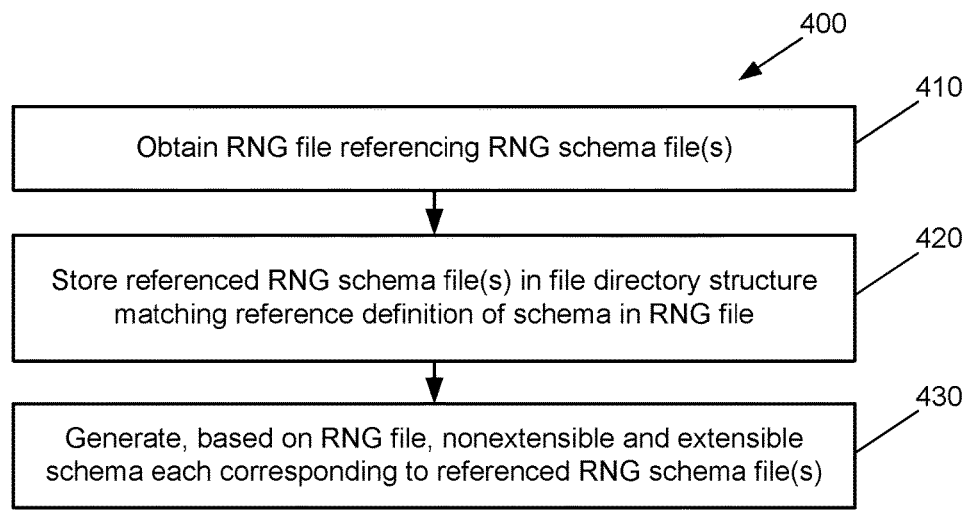
FIG. 4 is a process flow diagram illustrating conversion of an RNG file to extensible and nonextensible schemas.

Additionally, it should be appreciated that the RNG file generated using process flow diagram 300 can be used in any suitable process. For example, FIG. 4 is a process flow diagram illustrating an exemplary process flow diagram 400 for converting an RNG file to extensible and nonextensible schemas. However, the RNG file generated using process flow diagram 300 can be used in any other suitable process, and is not limited to use in implementing process flow diagram 400.

Process flow diagram 400 illustrated in FIG. 4 can be computer-implemented. For example, process flow diagram 400 can be implemented at a commerce hub (e.g., commerce hub 140 illustrated in FIG. 1) coupled to a vendor node (e.g., vendor node 110 illustrated in FIG. 1) and a plurality of customer nodes (e.g., customer node(s) 110' illustrated in FIG. 1). Additionally, process flow diagram 400 can be computer-implemented, e.g., can be implemented by XML schema module 155 operating on processing system 150 illustrated in FIG. 1, or any other suitable combination of hardware and software. It should be appreciated that process flow diagram 400 can be implemented independently of process flow diagram 200 described herein with reference to FIG. 2, e.g., need not necessarily be implemented solely as part of a process flow for generating and distributing extensible schemas and new nonextensible schemas based on nonextensible schemas of XML documents. Additionally, process flow diagram 400 can be implemented independently of process flow diagram 300 described herein with reference to FIG. 3 and/or independently of process flow diagram 500 described herein with reference to FIG. 5.

Process flow diagram 400 can include obtaining an RNG file referencing RNG schema file(s) (410). For example, an RNG file such as can be generated using process flow diagram 300 can be modified so as to reference one or more RNG schema files, for example using process flow diagram 500 described herein with reference to FIG. 5. Illustratively, the RNG schema file can include extension fields such as can be useful to transmit desired information between a vendor and a customer. In one example, commerce hub 140 and/or the central processing unit of processing system 150 illustrated in FIG. 1 can be configured so as to retrieve the RNG file referencing the RNG schema file(s) from computer-readable memory 130, data store(s) 170, from a buffer of processing system 150, or from any other suitable location within or connected to system 100, e.g., via network(s) 120.

One nonlimiting example of an RNG file referencing RNG schema file(s) is provided below (Example 2):

```
<?xml version="1.0" encoding="UTF-8"?>
<grammar xmlns:a="http://relaxng.org/ns/compatibility/annotations/1.0"
xmlns:xsi="http://www.w3.org/2001/XMLSchema-instance"
xmlns="http://relaxng.org/ns/structure/1.0" datatypeLibrary="">
  </define>
  <define name="first">
    <element name="first">
      <text/>
    </element>
  </define>
  <define name="last">
    <element name="last">
      <text/>
    </element>
  </define>
  <include href="1.0.0/supplyChain.rng"/>
  <define name="user">
    <element name="user">
      <optional>
        <attribute name="xsi:schemaLocation"
a:defaultValue="http://ariba.com.com/cXML.xsd">
          <value type="string">http://ariba.com.com/cXML
http://meta.ariba.com/cxmlservice/core/cXML/1.2.33/cXML.xsd</value>
        </attribute>
      </optional>
      <ref name="first"/>
      <ref name="last"/>
      <ref name="supplyChainExtension"/>
    </element>
  </define>
  <start>
    <ref name="user"/>
  </start>
</grammar>
```

In this example, the RNG of Example 1 is modified so as to include reference to an RNG schema (extension RNG).

One nonlimiting example of an RNG schema (e.g., extension RNG) that can be referenced in the RNG file of Example 2 above is provided below (Example 3):

```
<?xml version="1.0" encoding="UTF-8"?>
<grammar xmlns:extscm="http://ariba.com/Extension"
xmlns="http://relaxng.org/ns/structure/1.0">
  <define name="contact">
    <element name="extscm:contact">
      <attribute name="extscm:type"/>
      <zeroOrMore>
        <ref name="any"/>
      </zeroOrMore>
    </element>
  </define>
  <define name="contacts">
    <element name="extscm:contacts">
      <oneOrMore>
        <ref name="contact"/>
      </oneOrMore>
    </element>
  </define>
  <define name="supplyChainExtension">
    <element name="supplyChainExtension">
      <ref name="contacts"/>
    </element>
  </define>
  <define name="any" combine="choice">
    <choice>
      <ref name="contact"/>
      <ref name="contacts"/>
      <ref name="supplyChainExtension"/>
      <text/>
    </choice>
  </define>
</grammar>
```

In this example, the RNG schema (extension RNG) defines a list of contacts that is referenced by the RNG of Example 2. Usefully, any changes to such an RNG schema (extension schema) do not require any changes to the core schema (e.g., modified RNG referencing such RNG schema). The RNG schema (extension RNG) thus can be considered a plugin to the core schema (RNG file).

Referring again to FIG. 4, process flow diagram 400 also can include storing the referenced RNG schema file(s) in a file directory structure matching a reference definition of the schema in the RNG file (420). For example, XML, schema module 155 of processing system 150 illustrated in FIG. 1 can be configured so as to cause the central processing unit of the processing system to store the referenced RNG schema file in a file directory structure matching a reference definition of the schema in the RNG file, e.g., within computer-readable memory 130, data store(s) 170, in a buffer of processing system 150, or in any other suitable location within or connected to system 100, e.g., via network(s) 120. Such modification to the RNG schema file can facilitate generation of extensible and nonextensible schema corresponding to the RNG schema file. For example, TRANG may not necessarily generate DTDs or XSDs based on an RNG file that has reference(s) to RNG schema file(s).

Process flow diagram 400 illustrated in FIG. 4 further can include generating, based on the RNG file, a first nonextensible schema and a first extensible schema each corresponding to the referenced RNG schema file (430). For example, XML schema module 155 of processing system 150 illustrated in FIG. 1 can be configured so as to cause the central processing unit of the processing system to generate, based on the RNG file, a first nonextensible schema and a first extensible schema each corresponding to the referenced RNG schema file. Illustratively, the first nonextensible schema and first extensible schema can be referenced in an XML document, such as a cXML document, for example, a purchase order, order confirmation, invoice, catalog, or advanced ship notice. The commerce hub 140 can receive from and/or transmit to vendor node 110 and/or customer node 110' the cXML document.

The first nonextensible schema optionally can include a DTD and/or the first extensible schema optionally can include an XSD. The first nonextensible schema (e.g., DTD) and first extensible schema (e.g., XSD) can be generated based on the RNG file using any suitable conversion tool, e.g., a conversion tool that is custom-designed or that is commercially available. A non-limiting example of a commercially available, open source tool for converting an RNG file to a DTD file and/or an XSD is TRANG, mentioned above. For example, XML schema module 155 can be configured so as to cause the central processing unit of processing system 150 to execute TRANG on the RNG file so as to generate the DTD and XSD files. Any suitable combination of parameters or options can be input to TRANG at operation 430, which parameters or options can be stored within XML schema module 155 and/or stored within computer-readable memory 130, so as to cause TRANG to appropriately generate the RNC file based on the DTD file.

An exemplary DTD file such as can be generated based on the RNG schema of Example 3 above is provided below (Example 4):

```
<?xml encoding="UTF-8" ?>
<!ENTITY % any "#PCDATA|extscm:contact|extscm:
  contacts
  |supplyChainExtension">
<!ELEMENT extscm:contact (%any;)*>
```

```
<!ATTLIST extscm:contact
    xmlns:extscm CDATA #FIXED 'http://ariba.com/Ex-
        tension'
    extscm:type CDATA #REQUIRED>
<!ELEMENT extscm:contacts (extscm:contact)+>
<!ATTLIST extscm:contacts
    xmlns:extscm CDATA #FIXED 'http://ariba.com/Ex-
        tension'>
<!ELEMENT supplyChainExtension (extscm:contacts)>
```

An exemplary XSD file such as can be generated based on the RNG schema of Example 3 is provided below (Example 5):

```
<?xml version="1.0" encoding="UTF-8"?>
<xs:schema xmlns:xs="http://www.w3.org/2001/XMLSchema"
elementFormDefault="qualified" targetNamespace="http://ariba.com/
supplyChain"
xmlns:extscm="http://ariba.com/supplyChain">
  <xs:element name="contact">
    <xs:complexType mixed="true">
      <xs:group minOccurs="0" maxOccurs="unbounded"
ref="extscm:any"/>
      <xs:attribute name="type" use="required" form="qualified"/>
    </xs:complexType>
  </xs:element>
  <xs:element name="contacts">
    <xs:complexType>
      <xs:sequence>
        <xs:element maxOccurs="unbounded" ref="extscm:contact"/>
      </xs:sequence>
    </xs:complexType>
  </xs:element>
  <xs:group name="supplyChainExtension">
    <xs:sequence>
      <xs:element name="supplyChainExtension" form="unqualified">
        <xs:complexType>
          <xs:sequence>
            <xs:element ref="extscm:contacts"/>
          </xs:sequence>
        </xs:complexType>
      </xs:element>
    </xs:sequence>
  </xs:group>
  <xs:group name="any">
    <xs:sequence>
      <xs:choice minOccurs="0">
        <xs:element ref="extscm:contact"/>
        <xs:element ref="extscm:contacts"/>
        <xs:group ref="extscm:supplyChainExtension"/>
      </xs:choice>
    </xs:sequence>
  </xs:group>
</xs:schema>
```

An exemplary DTD file such as can be generated based on the RNG file of Example 6 including the RNG schema of Example 3 above is provided below (Example 6):

```
<?xml encoding="UTF-8"?>
<!ELEMENT first (#PCDATA)>
<!ELEMENT last (#PCDATA)>
<!ENTITY % Extension SYSTEM "supplyChain.dtd">
% Extension;
<!ELEMENT user (first,last,supplyChainExtension)>
<!ATTLIST user
    xmlns:xsi CDATA #FIXED 'http://www.w3.org/2001/
        XMLSchema-instance'
    xsi:schemaLocation CDATA #FIXED 'http://ariba.
        com.com/extension.xsd
    extension'>
```

In this example, the DTD (core) schema references a DTD extension schema via <!ENTITY % Extension SYSTEM "supplyChain.dtd">. As such, any modifications to the extension (DTD) schema need not require any modifications to the core (DTD) schema, and the extension schema can be considered a plugin to the core (DTD) schema. For example, DTD (core) schemas can be static.

An exemplary XSD file such as can be generated based on the RNG file of Example 6 including the RNG schema of Example 3 above is provided below (Example 7):

```
<?xml version="1.0" encoding="UTF-8"?>
<xs:schema xmlns:xs="http://www.w3.org/2001/XMLSchema"
elementFormDefault="qualified" xmlns:extscm="http://ariba.com/
supplyChain"
xmlns:xsi="http://www.w3.org/2001/XMLSchema-instance"
xmlns="http://ariba.com/cXML" >
  <xs:import namespace="http://ariba.com/supplyChain"
schemaLocation="supplyChain.xsd"/>
  <xs:import namespace="http://www.w3.org/2001/XMLSchema-instance"
schemaLocation="xsi.xsd"/>
  <xs:element name="first" type="xs:string"/>
  <xs:element name="last" type="xs:string"/>
  <xs:element name="user">
    <xs:complexType>
      <xs:sequence>
        <xs:element ref="first"/>
        <xs:element ref="last"/>
        <xs:group ref="extscm:supplyChainExtension"/>
      </xs:sequence>
      <xs:attribute ref="xsi:schemaLocation"
default="http://ariba.com.com/cXML.xsd"/>
    </xs:complexType>
  </xs:element>
</xs:schema>
```

In this example, the XSD (core) schema references an XSD extension schema via <xs:group ref="extscm:supplyChainExtension"/>. As such, any modifications to the extension (XSD) schema need not require any modifications to the core (XSD) schema.

In configurations in which operation 430 is implemented using system 100 illustrated in FIG. 1, the nonextensible and extensible schema, e.g., DTD file and XSD file, can be stored, for example, in computer-readable memory 130, data store(s) 170, in a buffer of processing system 150, or in any other suitable location within or connected to system 100, e.g., via network(s) 120.

Figure 5:
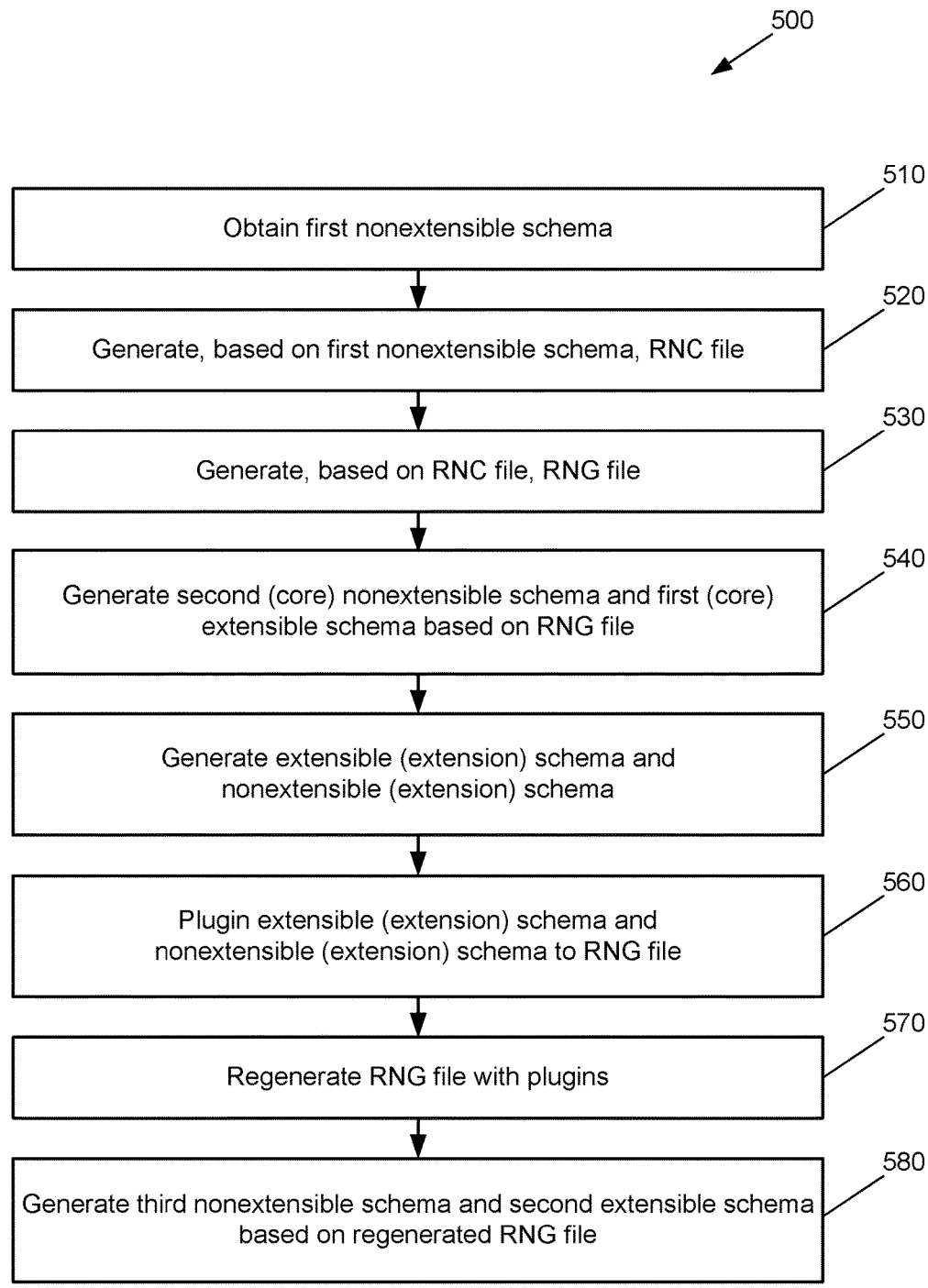
FIG. 5 is a process flow diagram illustrating generation of extensions for extensible and nonextensible schemas.

Optionally, the RNG file obtained in process flow diagram 400 of FIG. 4 is obtained using process flow diagram 300 of FIG. 3 and optionally is modified, prior to implementing process flow diagram 400, so as to include an RNG schema using process flow diagram 500 described herein with reference to FIG. 5. For example, the RNG file obtained at operation 410 can be generated by obtaining a second nonextensible schema (such as a DTD) including a first content model of ANY (e.g., implementing operation 310 of process flow diagram 300); generating, based on the second nonextensible schema, an RNC file including a second content model of ANY corresponding to the first content model of ANY (e.g., implementing operation 320 of process flow diagram 300); modifying, based upon the RNC file including the second content model of ANY, the RNC file so as to explicitly enumerate all semantics of the second content model of ANY as elements in the RNC file (e.g., implementing operation 330 of process flow diagram 300); and generating, based on the modified RNC file, the RNG file (e.g., implementing operation 340 of process flow diagram 300). Additionally, based upon the referenced RNG schema file including a wildcard or a content model of ANY, the referenced RNG schema file optionally can be modified so as to remove the wildcard or the content model of ANY; and the modified first extensible schema can be stored in a file directory structure matching a reference definition of the referenced RNG schema file in the RNG file.

Note that in embodiments in which process flow diagram 400 obtains an RNG file that is, or is based on, the RNG output by process flow diagram 300 illustrated in FIG. 3, the DTD generated at operation 430 can be different than the DTD obtained at operation 310. For example, an exemplary DTD that can be obtained at operation 310 is provided above as Example 2, and an exemplary DTD that can be generated at operation 430 is provided above as Example 10.

Additionally, note that the RNG file obtained at operation 410 of process flow diagram 400 need not necessarily reference an RNG schema file. In one example, such an RNG file is provided above at Example 1. An exemplary nonextensible schema, e.g., new DTD, that can be generated based on the RNG file of Example 1, e.g., using TRANG or other conversion tool, is provided below (Example 8):

<?xml encoding="UTF-8"?>
<!ELEMENT first (#PCDATA)>
<!ELEMENT last (#PCDATA)>
<!ELEMENT user (first,last)>
<!ATTLIST user
  xmlns:xsi CDATA #FIXED 'http://www.w3.org/2001/XMLSchema-instance'
  xsi:schemaLocation CDATA #FIXED 'http://ariba.com.com/cXML
  http://meta.ariba.com/cxmlservice/core/cXML/1.2.33/cXML.xsd </xs:schema>

In this example, the above DTD file includes definitions for the first and last names of a user as text (string) elements, and provides the same information as the RNG file of Example 1.

An exemplary extensible schema, e.g., XSD, that can be generated based on the RNG file of Example 1, e.g., using TRANG or other conversion tool, is provided below (Example 9):

```
<?xml version="1.0" encoding="UTF-8"?>
<xs:schema xmlns:xs="http://www.w3.org/2001/XMLSchema"
elementFormDefault="qualified" xmlns="http://ariba.com/cXML"
xmlns:xsi="http://www.w3.org/2001/XMLSchema-instance">
  <xs:import namespace="http://www.w3.org/2001/XMLSchema-instance"
schemaLocation="xsi.xsd"/>
  <xs:element name="first" type="xs:string"/>
  <xs:element name="last" type="xs:string"/>
  <xs:element name="user">
    <xs:complexType>
      <xs:sequence>
        <xs:element ref="first"/>
        <xs:element ref="last"/>
      </xs:sequence>
    </xs:complexType>
  </xs:element>
</xs:schema>
```

In configurations in which operation 430 is implemented using system 100 illustrated in FIG. 1, the nonextensible and extensible schema, e.g., DTD file and XSD file, can be stored, for example, in computer-readable memory 130, data store(s) 170, in a buffer of processing system 150, or in any other suitable location within or connected to system 100, e.g., via network(s) 120. Illustratively, the nonextensible schema and extensible schema, e.g., DTD file and XSD file, can be referenced in an XML document, such as a cXML document, for example, a purchase order, order confirmation, invoice, catalog, or advanced ship notice. The commerce hub 140 can receive from and/or transmit to vendor node 110 and/or customer node 110' the cXML document.

It should be appreciated that process flow diagram 400 can be implemented using any suitable combination of hardware and software. In one nonlimiting configuration, an article of manufacture includes computer executable instructions stored on a non-transitory computer readable medium, which, when executed by a computer, causes the computer to perform operations including: obtaining a regular language for XML next generation (RNG) file referencing an RNG schema file (e.g., implementing operation 410 of process flow diagram 400); storing the referenced RNG schema file in a file directory structure matching a reference definition of the schema in the RNG file (e.g., implementing operation 420 of process flow diagram 400); and generating, based on the RNG file, a first nonextensible schema and a first extensible schema each corresponding to the referenced RNG schema file (e.g., implementing operation 430 of process flow diagram 400).

FIG. 5 is a process flow diagram illustrating an exemplary process flow diagram 500 for generating extensions for extensible and nonextensible schemas. Process flow diagram 500 can provide an extension mechanism involving use of extension schemas and building core schemas with various components, while making the extensions pluggable. Process flow diagram 500 can provide separate core and extension schemas, so that changes to existing extensions do not necessarily impact the core schema. In comparison, adding extensions to an existing nonextensible schema, e.g., an existing DTD, can impact the core schema and impede processing of the DTD (e.g., by a commerce hub). Customers and/or vendors who are interested in using the extension schemas can upgrade their nodes for use of such extension schemas, or alternatively can continue to use the core schema without modifying their nodes, even if the extension schemas change.

Process flow diagram 500 can be implemented at a commerce hub (e.g., commerce hub 140 illustrated in FIG. 1) coupled to a vendor node (e.g., vendor node 110 illustrated in FIG. 1) and a plurality of customer nodes (e.g., customer node(s) 110' illustrated in FIG. 1). Additionally, process flow diagram 500 can be computer-implemented, e.g., can be implemented by XML schema module 155 operating on processing system 150 illustrated in FIG. 1, or any other suitable combination of hardware and software. It should be appreciated that process flow diagram 500 can be implemented independently of process flow diagram 200 described herein with reference to FIG. 2, e.g., need not necessarily be implemented solely as part of a process flow for generating and distributing extensible schemas and new nonextensible schemas based on nonextensible schemas of XML documents. Additionally, process flow diagram 400 can be implemented independently of process flow diagram 300 described herein with reference to FIG. 3 and/or independently of process flow diagram 400 described herein with reference to FIG. 4.

Referring to FIG. 5, process flow diagram 500 can include obtaining a first nonextensible schema (510). Operation 510 can be implemented similarly as operation 210 described above with reference to FIG. 2 and/or operation 310 described above with reference to FIG. 3. The first nonextensible schema can, but does not necessarily, include a first content model of ANY. The first nonextensible schema can be referenced in a commerce extensible markup language (cXML) document. The first nonextensible schema optionally can include a DTD.

Process flow diagram 500 also can include generating, based on the first nonextensible schema, an RNC file (520). Operation 520 can be implemented similarly as operation 320 described above with reference to FIG. 3. The RNC file can, but does not necessarily, include a second content model of ANY corresponding to the first content model of ANY.

Process flow diagram 500 also can include generating, based on the RNC file, a regular language for XML next generation (RNG) file (530). Operation 530 can be implemented similarly as operation 220 described above with reference to FIG. 2 and/or operation 340 described above with reference to FIG. 3.

Process flow diagram 500 also can include generating, based on the RNG file, a second (core) nonextensible schema and a first (core) extensible schema (540). For example, XML schema module 155 of processing system 150 illustrated in FIG. 1 can be configured so as to cause the central processing unit of the processing system to generate, based on the RNG file, a second (core) nonextensible schema and a first (core) extensible schema. The second nonextensible schema, e.g., a new DTD, can be generated similarly as the second nonextensible schema as described above with reference to operation 230 of FIG. 2 and/or the nonextensible schema described above with reference to operation 430 of FIG. 4. The first extensible schema, e.g., an XSD, can be generated similarly as the first extensible schema as described above with reference to operation 230 of FIG. 2 and/or the extensible schema as described above with reference to operation 430 of FIG. 4.

Process flow diagram 500 also can include generating an extensible (extension) schema and nonextensible (extension) schema (550). It should be appreciated that one or more extensions of selected type(s) can be generated at step 550, e.g., one or more extensible (extension) schema, and one or more nonextensible (extension) schema). Process flow diagram 500 also can include plugin of the extensible (extension) schema and nonextensible (extension) schema to the RNG file (560). Such extension schemas, when plugged into the RNG file, can be considered RNG schemas such as mentioned above with reference to FIG. 4. It should be appreciated that one or more extensions of selected type(s) can be plugged in at step 560, e.g., one or more extensible (extension) schema, and one or more nonextensible (extension) schema). The RNG file then can be regenerated, e.g., in a manner such as described with reference to FIG. 4 (570). A third nonextensible schema and second extensible schema can be generated based on the regenerated RNG file (580). The third nonextensible schema can correspond to the second (core) nonextensible schema, but also can include or be connected to a reference to the nonextensible (extension) schema. For example, the nonextensible (extension) schema, which also can be referred to as a nonextensible plugin, can be wrapped with the reference to the third nonextensible schema. The second extensible schema can correspond to the first (core) extensible schema, but also can include or be connected to a reference to the extensible (extension) schema. For example, the extensible (extension) schema, which also can be referred to as an extensible plugin, can be wrapped with the reference to the second nonextensible schema. In one example, XML, schema module 155 of processing system 150 illustrated in FIG. 1 can be configured so as to cause the central processing unit of the processing system to implement operations 550-580.

Process flow diagram 500 optionally can include generating a new XML document referencing the third nonextensible schema and the second extensible schema, e.g., by client 110 or 110'. The resulting XML document can support backwards compatibility, e.g., for vendors or customers who are not equipped (or do not desire to) to process XSD schemas but who can process DTD schemas. The XML document optionally can be an cXML document, such as a purchase order, order confirmation, invoice, catalog, or advanced ship notice. Referring to FIG. 1, commerce hub 140 can receive the cXML document from a customer node 110' or vendor node 110 or and/or can transmit the cXML document to a customer node 110' or vendor node 110.

In one configuration, the XML document can reference the new schema, e.g., include a link or URL to the third nonextensible schema and the second extensible schema. For example, the XML document can be wrapped in a header that references the third nonextensible schema (e.g., new DTD) and references the second extensible schema (e.g., XSD), such as by modifying the header so as to reference the third nonextensible schema and the second extensible schema. Additionally, so as to reference extension schemas in the XML document, new sections can be added to the second XML document where such extensions are desired, and such sections can be wrapped with a reference to the extension schema.

An exemplary XML document that references a third nonextensible schema (e.g., new DTD) and a second extensible schema (e.g., XSD) is provided below (Example 10):

<?xml version="1.1" encoding="UTF-8"?>
<!DOCTYPE user SYSTEM
  "http://meta.ariba.com:8080/cxmlservice/core/1.32.0/cxml.dtd">
<user        xmlns:xsi="http://www.w3.org/2001/
  XMLSchema-instance"
xsi:schemaLocation="http://ariba.com/cXML
http://meta.ariba.com/cxmlservice/core/1.32.0/cxml.xsd"
  xmlns="http://ariba.com/cXML">
  <first>Joe</first>
  <last>Cool</last>
  <supplyChainExtension><extscm:contacts
xsi:schemaLocation="http://ariba.com/supplyChain
  core_
http://meta.ariba.com/cxmlservice/extension/1.1.0/sup-
  plyChain.xsd"
xmlns:extscm="http://ariba.com/supplyChain">
  <extscm:contact
extscm:type="email">joe.cool@gmail.com</extscm:
  contact>
  <extscm:contact extscm:type="phone">4081234000</
    extscm:contact>
  </extscm:contacts>
  </supplyChainExtension>
</user>

It can be seen that the header of the XML document of Example 10 is wrapped in references to a .dtd file and to a .xsd file, which correspond to extension schemas. Entities that desire to use extension schemas can utilize these references, while entities that do not desire to use extension schemas need not utilize these references. For example, for entities that do not desire to use extension schemas, the references can be recognized as valid but the details of such references can be ignored.

It should be appreciated that process flow diagram 500 can be implemented using any suitable combination of hardware and software. In one nonlimiting configuration, an article of manufacture includes computer executable instructions stored on a non-transitory computer readable medium, which, when executed by a computer, causes the computer to perform operations including: obtaining a first nonextensible schema (e.g., implementing operation 510); generating, based on the first nonextensible schema, a compact syntax regular language for XML next generation (RNC) file (e.g., implementing operation 520); generating, based on the RNC file, a regular language for XML next generation (RNG) file (e.g., implementing operation 530); generating, based on the RNG file, a second (core) nonextensible schema and a first (core) extensible schema (e.g., implementing operation 540); generating an extensible (extension) schema and a nonextensible (extension) schema (e.g., implementing operation 550); plugging in the extensible (extension) schema and the nonextensible (extension) schema to the RNG file (e.g., implementing operation 560); regenerating the RNG file with the plugins (e.g., implementing operation 570); and generating a third nonextensible schema and a second extensible schema based on the regenerated RNG file (e.g., implementing operation 580). Optionally, the extensible (extension) schema is wrapped with the reference to the second extensible schema.

Accordingly, among other things, the present systems, methods, and computer-readable media provide components, such as core component files (e.g., core schema files) and extension component files (e.g., extension schema files). Component files can, at appropriate times, be in RNG format which is the source of truth, and can be checked-in by schema developers to a git (version control system), optionally which can be provided at commerce hub 140. Additionally, or alternatively, a schema aggregate definition, which defines the components that make up the final schema aggregate file, can be checked in by schema developers to the git. Additionally, or alternatively, the schema aggregate can be generated and stored by a cXML extensibility service. An RNG file can be generated based on the aggregate definition, and then transformed to XSD and DTD formats and stored by the service (RNG/XSD/DTD). This can provide schema file(s) that can be referenced by XML documents, such as cXML.dtd, cXML.xsd, private.xsd, and the like. The file(s) are generated by the service whenever a schema developer checks-in a component or a schema aggregate definition file to the git. The changes from git can be pulled by the cXML extensibility service. Additionally, or alternatively, a schema description file can be checked-in by schema developers to the git, and can explain the reason and details related to the schema change, e.g., for approval for the change.

Additional Examples

An overview of exemplary operations in a non-limiting configuration of a process flow is provided below. Additional details regarding certain operations also are provided.

1. The current cXML files (XML) are created according to the existing DTDs. The sender and/or receiver generates/validates the cXML based on the DTD referenced in the cXML file (XML).

2. To provide extensibility and support other schema formats, the design plan includes generating RNG schema files from the current DTDs. These can be called as core schema files (RNG/XSD/DTD). There are also extension schema files (from step #5).

a. Existing DTD files are converted to an RNC format and then the RNC schemas are converted to an RNG format (this can be a one-time process).

b. RNG schema files are now the source of truth for schemas. Any future changes to the schema can be made first in these RNG schema files.

c. These RNG schema files are then converted to XSD, DTD and if desired to other formats as well.

d. These XSD and DTD schema files can be then referenced in an actual cXML document (XML).

3. The sender or receiver can reference the schema file in either XSD or DTD format or both. For example, until all senders and receivers completely start using XSD, both XSD and DTD reference can be included in the cXML file.

a. In one nonlimiting option, the RNG file is not referenced or transmitted as part of the cXML document.

b. XSD and/or DTD file reference is included in the cXML. In one option, the actual schema document (XSD/DTD) is not included when transmitting the cXML document. The receiver either downloads or already has the schema document referenced in the cXML document.

c. In one option, the reference path of XSD or DTD included in the cXML document, is a fully qualified URL to download these schema documents.

d. With this design, both XSD and DTD schema can be supported to be included in a cXML document. However, in another option in which all senders/receivers use only XSDs, the new DTD schema need not necessarily be generated or referenced.

4. Any edits to the RNG schema related to cXML can be performed by the commerce hub and can be converted to XSD/DTD formats (again done by the commerce hub). The schema files then can be published to an externally accessible portal for senders/receivers to download and use/reference in cXML documents.

a. However, as one option, external customers/senders/receivers can update and add RNG schema files and/or also convert them to other formats.

5. For using extensions in Schema a. Schema extensions can be created in an RNC/RNG format similar to the core schema file. They are then converted to XSD and DTD formats. Similar to the core schema files, both XSD and DTD formats are generated for extensions to support backward compatibility. As another option in which all the senders/receivers use XSDs, DTD schema format need not necessarily be generated. Optionally, there can be a reference to one or more RNC/RNG files in the RNC/RNG file, e.g., so as to support extension and hierarchy.

b. These extension schema files can be plugged into the core schema file (in one option, only a reference of the extension schema is included). It can be included at any suitable location. Multiple schema files can be plugged into a single core schema file. This change is done in the RNG schema file. This can be a core schema file.

c. Another operation is to regenerate the core schema files in XSD/DTD formats which have references to the extension schema files 6. Usage a. Core schema files (not necessarily extension schema files)—Reference to core XSD or DTD or both can be included in the header of cXML document (XML).

b. Both core and extension schema files—Reference to core XSD or DTD or both can be included in the header of cXML document (XML). In addition, the extension portion of the cXML (XML format) can be wrapped around by a reference to the XSD extension schema.

One or more aspects or features of the subject matter described herein can be realized in digital electronic circuitry, integrated circuitry, specially designed application specific integrated circuits (ASICs), field programmable gate arrays (FPGAs), computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 6:
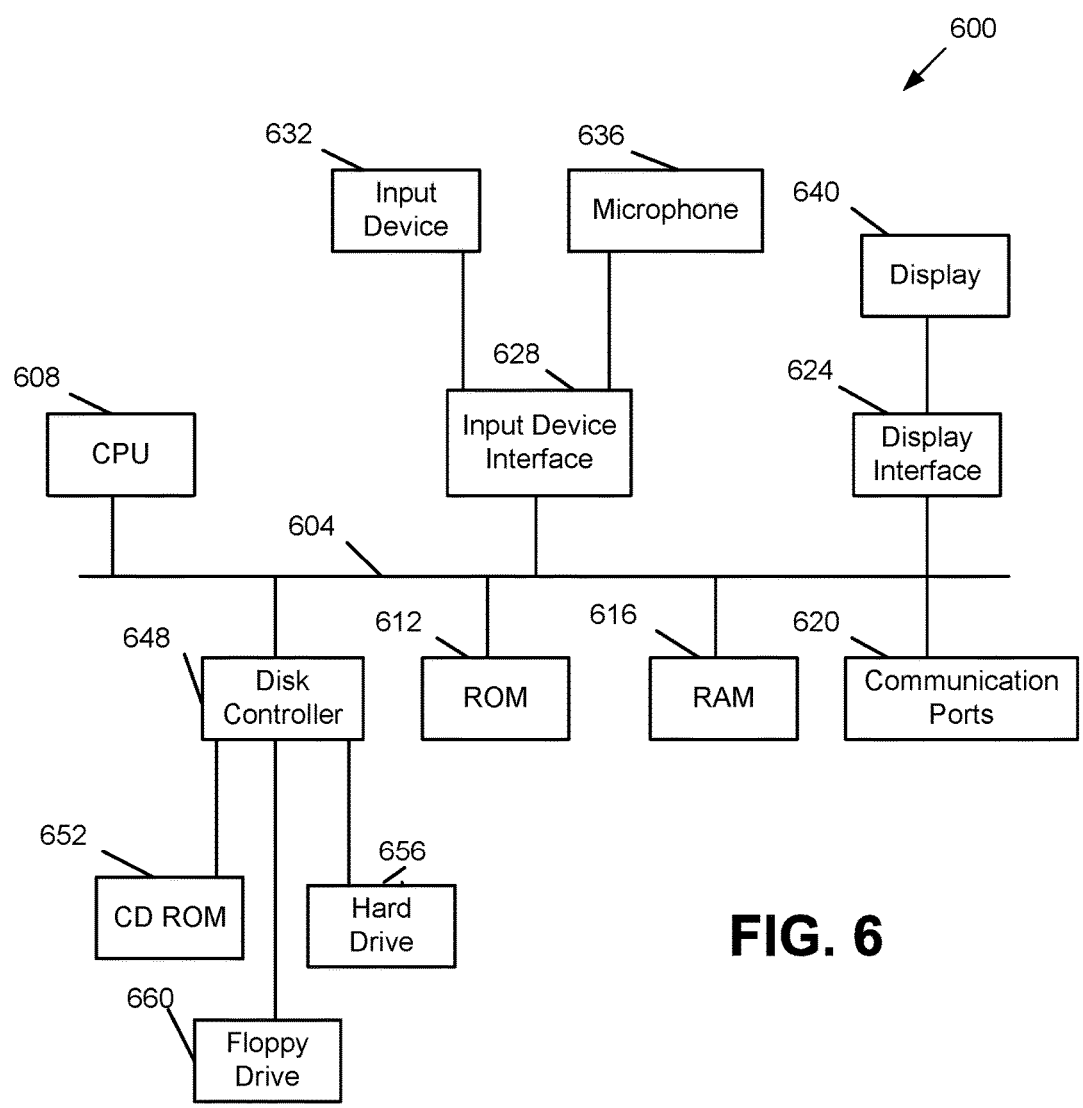
FIG. 6 is a diagram illustrating a sample computing device architecture for implementing various aspects described herein.

FIG. 6 is a diagram 600 illustrating a sample computing device architecture for implementing various aspects described herein, such as any aspect that can be processed using server(s) 140 (e.g., commerce node), client device(s) 110 or 110' (e.g., vendor node or customer node), or processing system 150 executing XML schema module 155. A bus 604 can serve as the information highway interconnecting the other illustrated components of the hardware. A processing system 608 labeled CPU (central processing unit) (e.g., one or more computer processors/data processors at a given computer or at multiple computers), can perform calculations and logic operations required to execute a program. A non-transitory processor-readable storage medium, such as read only memory (ROM) 612 and random access memory (RAM or buffer) 616, can be in communication with the processing system 608 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 648 can interface one or more optional disk drives to the system bus 604. These disk drives can be external or internal floppy disk drives such as 660, external or internal CD-ROM, CD-R, CD-RW or DVD, or solid state drives such as 652, or external or internal hard drives 656. As indicated previously, these various disk drives 652, 656, 660 and disk controllers are optional devices. The system bus 604 can also include at least one communication port 620 to allow for communication with external devices either physically connected to the computing system or available externally through a wired or wireless network. In some cases, the communication port 620 includes or otherwise comprises a network interface.

To provide for interaction with a user, the subject matter described herein can be implemented on a computing device having a display device 640 (e.g., a CRT (cathode ray tube) or LCD (liquid crystal display) monitor) for displaying information obtained from the bus 604 to the user and an input device 632 such as keyboard and/or a pointing device (e.g., a mouse or a trackball) and/or a touchscreen by which the user can provide input to the computer. Other kinds of input devices 632 can be used to provide for interaction with a user as well; for example, feedback provided to the user can be any form of sensory feedback (e.g., visual feedback, auditory feedback by way of a microphone 636, or tactile feedback); and input from the user can be received in any form, including acoustic, speech, or tactile input. In the input device 632 and the microphone 636 can be coupled to and convey information via the bus 604 by way of an input device interface 628. Other computing devices, such as dedicated servers, can omit one or more of the display 640 and display interface 624, the input device 632, the microphone 636, and input device interface 628.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method comprising:
obtaining a regular language for XML next generation (RNG) file referencing an RNG schema file;
storing the referenced RNG schema file in a file directory structure matching a reference definition of the schema in the RNG file; and
generating, based on the RNG file, a first nonextensible schema and a first extensible schema each corresponding to the referenced RNG schema file,
wherein obtaining the RNG file comprises:
obtaining a second nonextensible schema including a first content model of ANY;
generating, based on the second nonextensible schema, a compact syntax regular language for XML next generation (RNC) file including a second content model of ANY, the second content model of ANY corresponding to the first content model of ANY;
modifying, based upon the RNC file including the second content model of ANY, the RNC file so as to explicitly enumerate all semantics of the second content model of ANY as elements in the RNC file; and
generating, based on the modified RNC file, the RNG file.

2. The method of claim 1, wherein the first nonextensible schema and first extensible schema are referenced in a commerce XML (cXML) document.

3. The method of claim 2, wherein the first nonextensible schema comprises a document type definition (DTD).

4. The method of claim 3, wherein the first extensible schema comprises an XML schema definition (XSD).

5. The method of claim 1, further comprising:
based upon the referenced RNG schema file including a wildcard or a content model of ANY, modifying the referenced RNG schema file so as to remove the wildcard or the content model of ANY; and
storing the modified first extensible schema in a file directory structure matching a reference definition of the referenced RNG schema file in the RNG file.

6. The method of claim 2, wherein the cXML document comprises a purchase order, order confirmation, invoice, catalog, or advanced ship notice.

7. The method of claim 6, wherein the method is implemented at a commerce hub coupled to a vendor node and a plurality of customer nodes.

8. The method of claim 7, wherein the commerce hub receives the cXML document from a customer node of the plurality of customer nodes and transmits the cXML document to the vendor node.

9. The method of claim 7, wherein the commerce hub receives the cXML document from the vendor node and transmits the cXML document to a customer node of the plurality of customer nodes.

10. A system comprising:
a central processing unit; and
a computer-readable medium storing instructions for causing the central processing unit to perform operations comprising:
obtaining a regular language for XML next generation (RNG) file referencing an RNG schema file;
storing the referenced RNG schema file in a file directory structure matching a reference definition of the schema in the RNG file; and
generating, based on the RNG file, a first extensible markup language (XML) document referencing a first nonextensible schema and a first extensible schema each corresponding to the referenced RNG schema file,
wherein the computer-readable medium further stores instructions for causing the central processing unit to obtain the RNG file using operations comprising:
obtaining a second nonextensible schema including a first content model of ANY;
generating, based on the second nonextensible schema, a compact syntax regular language for XML next generation (RNC) file including a second content model of ANY, the second content model of ANY corresponding to the first content model of ANY;
modifying, based upon the RNC file including the second content model of ANY, the RNC file so as to explicitly enumerate all semantics of the second content model of ANY as elements in the RNC file; and
generating, based on the modified RNC file, the RNG file.

11. The system of claim 10, wherein the first nonextensible schema and first extensible schema are referenced in a commerce XML (cXML) document.

12. The system of claim 11, wherein the first nonextensible schema comprises a document type definition (DTD).

13. The system of claim 12, wherein the first extensible schema comprises an XML schema definition (XSD).

14. The system of claim 10, wherein the computer-readable medium further stores instructions for causing the central processing unit to perform operations comprising:
based upon the referenced RNG schema file including a wildcard or a content model of ANY, modifying the referenced RNG schema file so as to remove the wildcard or the content model of ANY; and
storing the modified first extensible schema in a file directory structure matching a reference definition of the referenced RNG schema file in the RNG file.

15. The system of claim 11, wherein the cXML document comprises a purchase order, order confirmation, invoice, catalog, or advanced ship notice.

16. The system of claim 15, wherein the central processing unit is located at a commerce hub coupled to a vendor node and a plurality of customer nodes.

17. The system of claim 16, wherein the central processing unit receives the cXML document from a customer node of the plurality of customer nodes and transmits the cXML document file to the vendor node, or
wherein the central processing unit receives the cXML document from the vendor node and transmits the cXML document to a customer node of the plurality of customer nodes.

18. An article of manufacture comprising:
computer executable instructions stored on non-transitory computer readable media, which, when executed by at least one computer, causes the at least one computer to perform operations comprising:
obtaining a regular language for XML next generation (RNG) file referencing an RNG schema file;

storing the referenced RNG schema file in a file directory structure matching a reference definition of the schema in the RNG file; and generating, based on the RNG file, a nonextensible schema and an extensible schema each corresponding to the referenced RNG schema file, wherein the computer-readable medium further causes the at least on computer to obtain the RNG file using operations comprising:

obtaining a second nonextensible schema including a first content model of ANY;

generating, based on the second nonextensible schema, a compact syntax regular language for XML next generation (RNC) file including a second content model of ANY, the second content model of ANY corresponding to the first content model of ANY;

modifying, based upon the RNC file including the second content model of ANY, the RNC file so as to explicitly enumerate all semantics of the second content model of ANY as elements in the RNC file; and generating, based on the modified RNC file, the RNG file.

19. The article of manufacture of claim 18, wherein the first nonextensible schema and first extensible schema are referenced in a commerce XML (cXML) document.

20. The article of manufacture of claim 18, wherein the first nonextensible schema comprises a document type definition (DTD).

* * * * *